United States Patent [19]
Stephenson

[11] Patent Number: 5,990,994
[45] Date of Patent: *Nov. 23, 1999

[54] FIRST AND SECOND LIGHT SENSITIVE CONDUCTIVE LAYERS FOR USE IN IMAGE DISPLAYS

[75] Inventor: Stanley W. Stephenson, Spencerport, N.Y.

[73] Assignee: Eastman Kodak Company, Rochester, N.Y.

[ * ] Notice: This patent is subject to a terminal disclaimer.

[21] Appl. No.: 08/961,056

[22] Filed: Oct. 30, 1997

[51] Int. Cl.⁶ .............................. G02F 1/1335; G03F 9/00
[52] U.S. Cl. .................................. 349/106; 430/7; 349/2
[58] Field of Search ................... 349/106, 2, 116, 349/42; 430/7

[56] References Cited

U.S. PATENT DOCUMENTS

| | | | |
|---|---|---|---|
| 3,033,765 | 5/1962 | King et al. | |
| 3,464,822 | 9/1969 | Blake et al. | 96/38.4 |
| 3,892,574 | 7/1975 | Claes et al. | 96/107 |
| 4,610,509 | 9/1986 | Sorimachi et al. | 350/339 |
| 4,772,885 | 9/1988 | Uehara et al. | 340/784 |
| 5,128,736 | 7/1992 | Yoshida et al. | 357/30 |
| 5,245,452 | 9/1993 | Nakamura et al. | 349/140 |
| 5,462,822 | 10/1995 | Roosen et al. | 430/7 |
| 5,462,833 | 10/1995 | Hauquier et al. | 430/159 |
| 5,471,330 | 11/1995 | Sarma | 349/140 |
| 5,565,310 | 10/1996 | Kawai | 430/503 |
| 5,705,424 | 1/1998 | Zavracky et al. | 437/86 |
| 5,858,581 | 1/1999 | Stephenson | 430/7 |
| 5,912,716 | 6/1999 | Stephenson | 349/106 |

OTHER PUBLICATIONS

Liquid Crystal Flat Panel Displays by William C. O'Mara, Manufacturing Science & Technology.

*Primary Examiner*—William L. Sikes
*Assistant Examiner*—Tarifur R. Chowdhury
*Attorney, Agent, or Firm*—Raymond L. Owens

[57] ABSTRACT

A structure used in making a display for forming images including a transparent substrate having first and second surfaces; a light sensitive conductive layer provided over the first surface of the transparent substrate and patternable to form conductive traces; and a layer including light modulating material being provided over the light sensitive conductive layer. The structure also includes a second light sensitive conductive layer provided over the light modulating material layer.

10 Claims, 6 Drawing Sheets

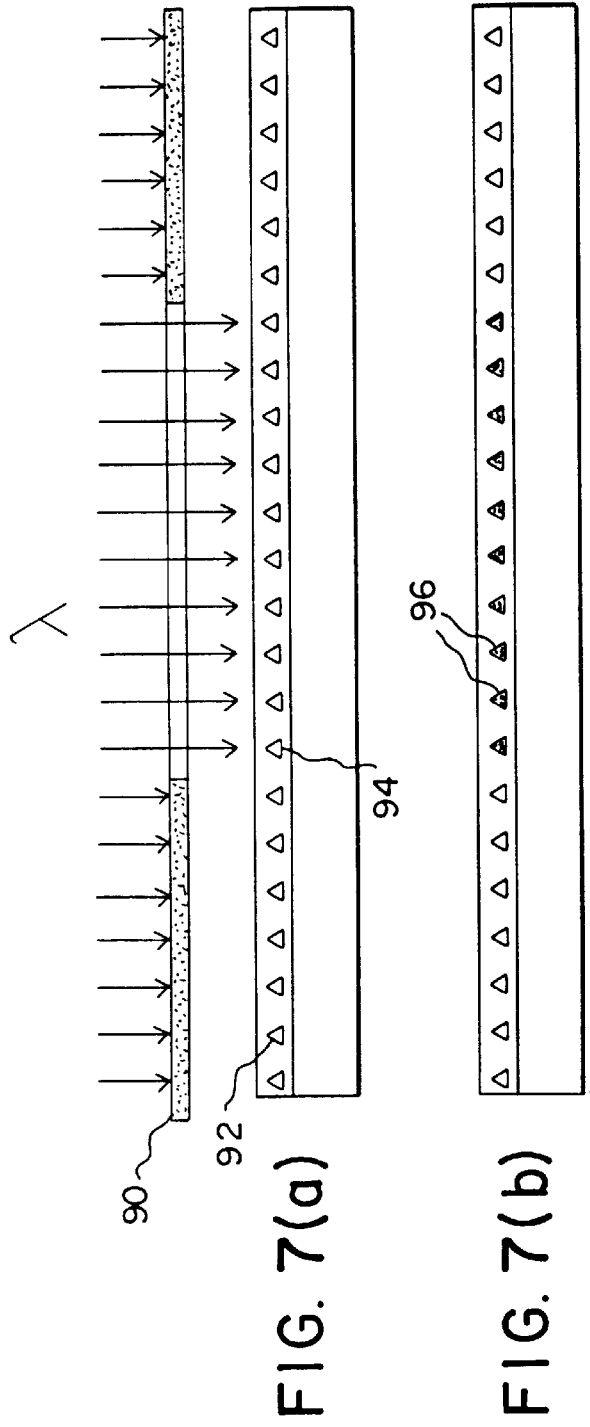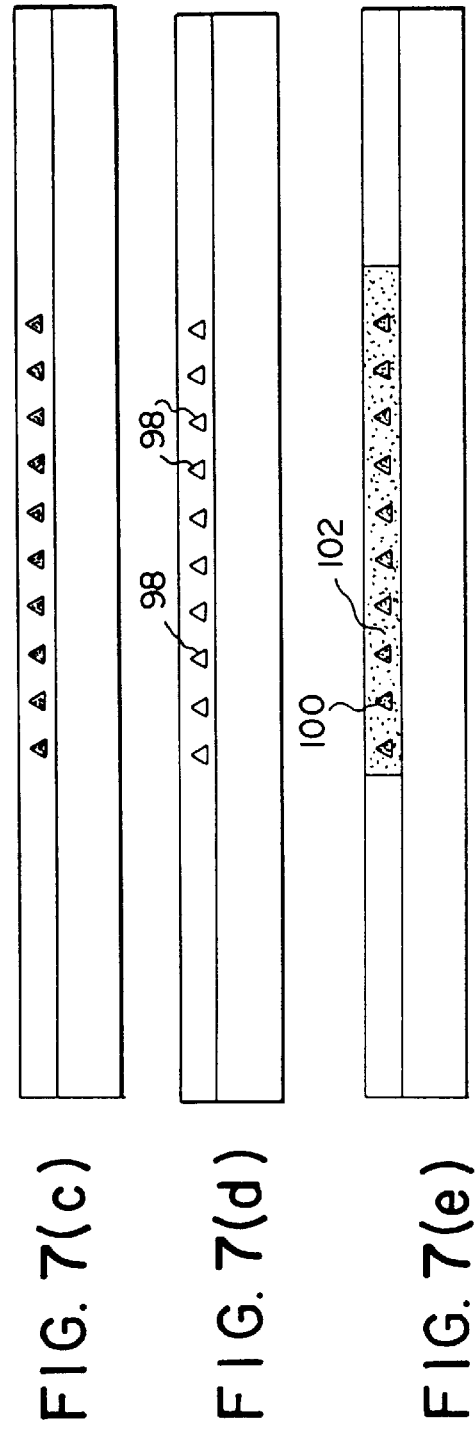

FIRST AND SECOND LIGHT SENSITIVE CONDUCTIVE LAYERS FOR USE IN IMAGE DISPLAYS

CROSS REFERENCE TO RELATED APPLICATIONS

The present invention is related to commonly assigned U.S. patent application Ser. No. 08/961,059 filed Oct. 30, 1997, entitled "Display Apparatus Using Light Patternable Conductive Traces" to Stanley W. Stephenson. The disclosure of this related application is incorporated herein by reference.

FIELD OF THE INVENTION

The field of invention pertains to image displays. The invention is directed to flat panel displays that use electrically modulated signals to control light passing through thin multi-layered plates. The invention more specifically uses two separated sets of traces to provide electrical potential across light modulating material.

BACKGROUND OF THE INVENTION

Flat panel displays can be fabricated using many techniques. Typical embodiments are disclosed in *Liquid Crystal Flat Panel Displays* by O'Mara and other similar publications. These displays use transparent glass plates as substrates, and electrical traces are sputtered in a pattern of parallel lines that form a first set of conductive traces. A transparent conductor such as Indium Tin Oxide is sputtered over the traces to disperse an electrical charge across transparent areas not blocked by the traces. A second substrate is similarly coated with a set of traces having a transparent conductive layer.

Layers are applied over the substrates and patterned to orient liquid crystals in twisted nematic (TN) or super-twisted-nematic (STN) configurations. The two substrates are spaced apart and the space between the two substrates is filled with a liquid crystal material. Pairs of conductors from either set are selected and energized to alter the optical transmission properties of the liquid crystal material.

In another embodiment, the traces do not define an orthogonal grid, but are organized to form alpha-numeric displays or graphic images. In a further embodiment, an active display on a transparent substrate is sputtered or printed and uses memory elements to continuously drive a each display element depending on information written to the memory element. In another embodiment, disclosed in SID DIGEST 90, article 12.6, the liquid crystal material can be polymerically dispersed to form a Liquid Crystal Polymer Matrix (LCPC). LCPCs are typically disposed in ultra-violet polymerized acrylic polymers. The liquid crystals are homogenized into the polymer, and the emulsion is coated onto a substrate. Ultra violet light is applied to the emulsion. The emulsion hardens, and bubbles of liquid crystal material are held in a rigid polymeric matrix.

Image displays can provide color images if a color filter array is formed over the pixels of the display. In U.S. Pat. No. 5,462,833, three color layers are formed on a transparent substrate. In this patent, a transparent electrode layer is formed over the color filter. The filter plate is aligned onto a liquid crystal layer. The plate is glass and has silver halide, color-forming layers. A transparent electrode material is sputtered at high temperature over the CFA. In practice, the presence of the transparent electrode material causes ionic migration of the dyes in the dye layers. It would be advantageous to separate the electrically conductive layer from the dye layers.

The prior art requires many multiple, separate layers on multiple plates to build up the display. The electrical traces and transparent conductive layers are typically formed through repeated vacuum deposition of materials on the substrate. These processes are expensive and require long processing times on capital intensive equipment. It would be advantageous to lower the cost of flat panel displays. Additionally, current structures are not amenable to the creation of low-cost large flat panel displays. It would be advantageous to be able to form low-cost, large flat-panel displays.

SUMMARY OF THE INVENTION

It is an object of the present invention to provide a display apparatus which overcomes the problems noted above.

Another objective of the present invention is to provide conductive traces for use in conjunction with a light modulating layer.

These objects are achieved in a structure used in making a display for forming images comprising:

a) a transparent substrate having first and second surfaces;

b) a light sensitive conductive layer provided over the first surface of the transparent substrate and patternable to form conductive traces;

c) a layer including light modulating material being provided over the light sensitive conductive layer; and d) a second light sensitive conductive layer provided over the light modulating material layer.

ADVANTAGES

The disclosed structure has the advantage of producing a display using low-cost, low-temperature layers and processes. The display utilizes low-cost photographic layer technology. It employs a light modulating layer and patterned conductive traces. Large volumes of sheet material can be coated and formed into different types of displays by exposing the light sensitive material to different patterns.

BRIEF DESCRIPTION OF THE DRAWINGS

FIGS. 7a–7e show various steps in the formation of the conductive traces in accordance with the present invention;

FIG. 8b is a sectional view taken along the lines 8—8 of FIG. 7a.

DETAILED DESCRIPTION OF THE INVENTION

Figure 1:
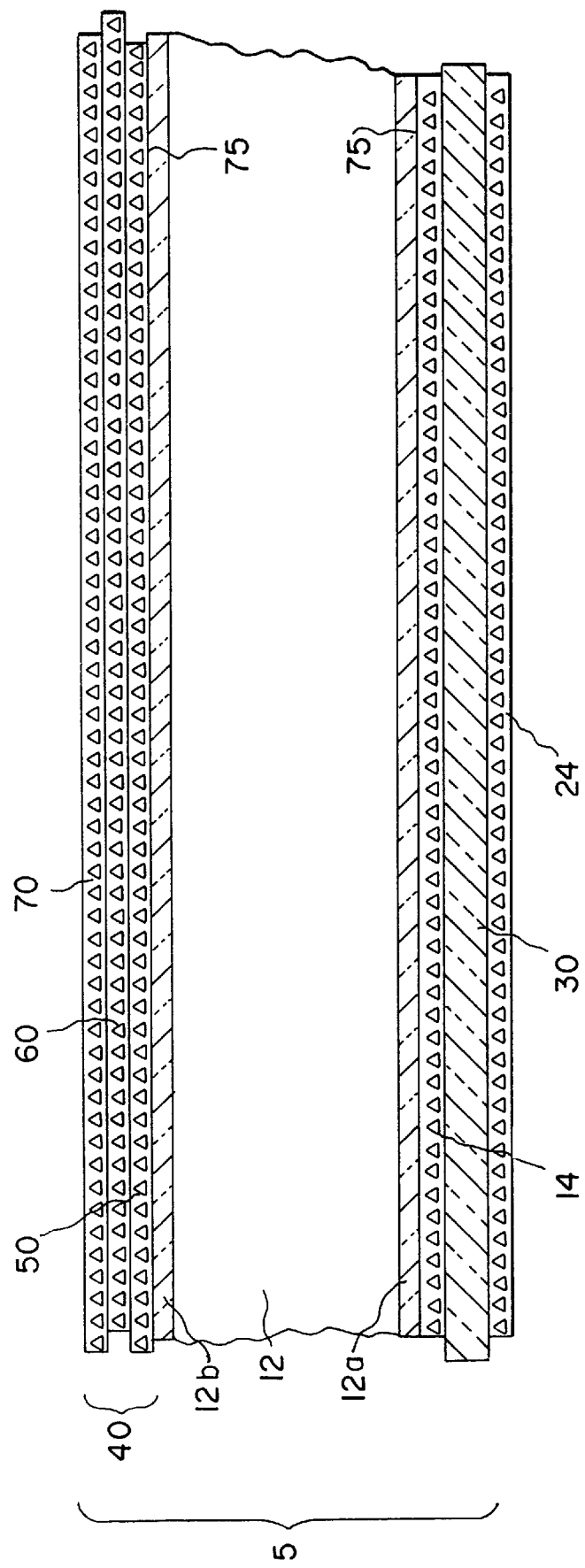
FIG. 1 is a section view of an unprocessed sheet comprising the invention.

A sectional view of the invention is shown in FIG. 1. A display 5 has a substrate 12 is used which can be a clear transparent material such as Kodak Estar film base formed of polyester plastic and has a thickness of between 20 and 200 microns. In the exemplary embodiment, substrate 12 is a 80 micron thick sheet of polyester film base. Other clear polymers, such as polycarbonate can also be used. Substrate 12 has a first face 12a that supports a light sensitive, metal forming layer 14.

In the preferred embodiment, the light sensitive, metal forming layer 14 is an emulsion of silver halide grains. Alternatively, other light sensitive, metal forming materials can be used such as gold or copper salts. In the case of silver halide emulsions, high concentrations of silver halide salts in gelatin are used to improve conductivity over conventional imaging emulsions. Conductive additives such as fine Indium-Tin-Oxide or fine silver with particle sizes between 0.5 and 2 microns are added to emulsion to improve conductivity of photographically produced metallic silver.

Over the first light sensitive layer 14 is a coatable light modulating layer 30. Light modulating layer 30 can be a liquid crystal of conventional design. In one embodiment, a liquid crystal material is homogenized in a polymeric binder such as gelatin. The liquid crystal, gelatin emulsion is coated to a thickness of between 1 and 30 microns to optimize light modulating of light modulating layer 30. Other light-modulating, electrically operated materials can also be coated such as a micro-encapsulated ferroelectric (FLC) material.

Figure 2:
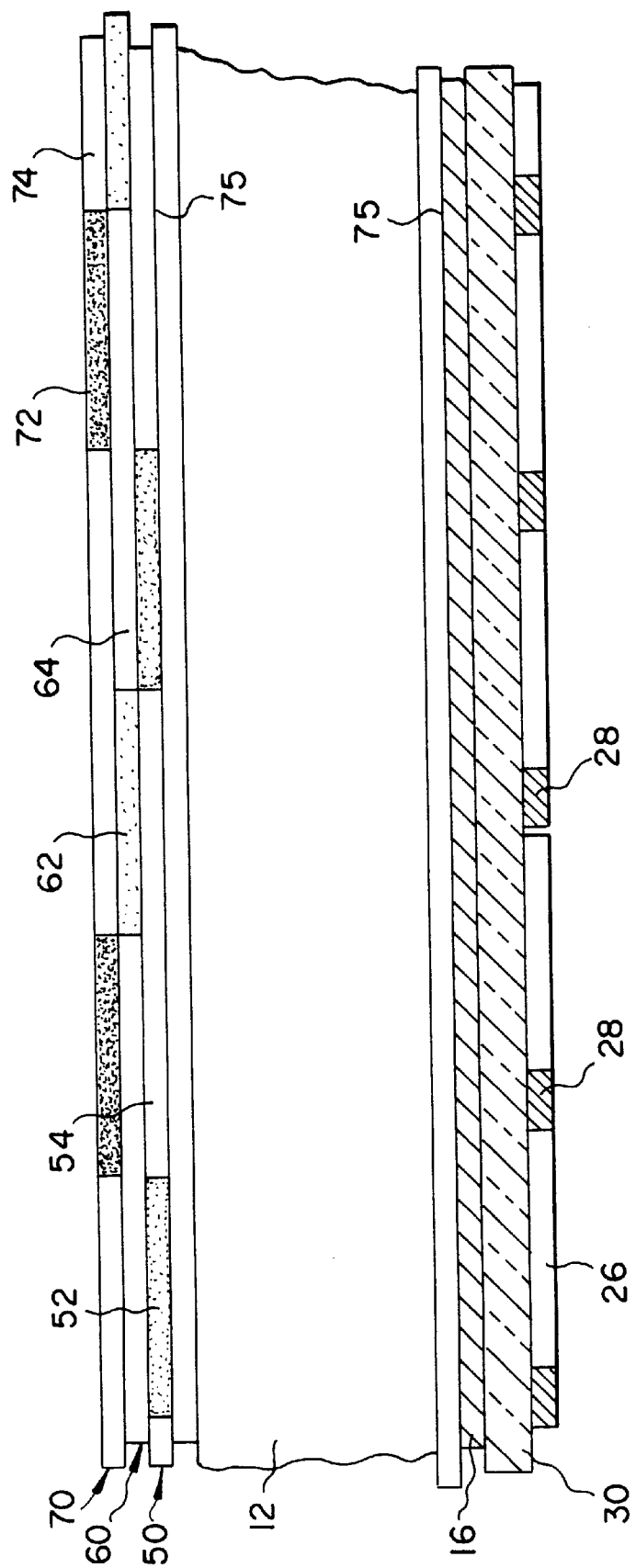
FIG. 2 is a section view of a processed sheet of the invention in FIG.1.

A second light sensitive layer 24 is applied over the light modulating layer 30. Second light sensitive layer 24 is similar in nature to first light sensitive layer 14. Second light sensitive layer 24 is sensitized to a different wavelength of light. In the case of silver halide emulsions, conventional light sensitizers are used. In one embodiment, first light sensitive layer 14 is silver halide emulsion sensitized to green light. Second light sensitive layer 24 is a silver halide emulsion sensitized to red or infra-red radiation. In FIG. 2, each of the light sensitive layers 14 and 24 has been exposed to their respective sensitized color of light through one or more masks and developed to form non-conducting areas 26 and conducting areas 28.

The second surface 12b of substrate 12 supports a color filter array 40. Color filter array 40 can be a single layer printed on substrate 12 before first light sensitive layer 14 is applied to substrate 12. Alternatively, color filter array 40 can be a three layer of silver halide color dye forming chemistry, each layer forming a separate color of color filter array 40. An example of such a multi-layer array can be found in U.S. Pat. No. 5,462,822. That invention sputters a conductive layer under high temperature over the color filter array. In this invention, the conductive layer is metallic traces dispoed on the first surface 12a of substrate 12.

It is an important part of this invention that color filter array 40 be disposed on the second surface 12b of the sheet in the case of silver halide color dye forming emulsions. Metal development processes that are used to create electrically conducting traces 16 and 28 require retention of the metallic silver. In the case of color dye forming silver halide emulsions, the opaque metallic silver must be removed to permit transmission of light through the formed dyes. Disposing the color forming silver halide emulsions on one side and the metal forming silver halide emulsion on the other side of substrate 12 permits separate chemical processing of the layers. In the case of having color filter array 40 formed on the second side 12b of substrate 12, the size of the formed pixels must be significantly greater than the thickness of the sheet to prevent light from one modulated pixel from illuminating a different color filter area. In the case of the 80 micron thick substrate 12, the dimensions of the pixels should be greater than 5 times the thickness of the sheet, or greater than 400 microns.

FIG. 2 includes an exposed and developed color filter array 40. A red filter layer 50 is a silver halide emulsion layer that has been exposed and developed to create red filter dyed areas 52 and red filter undyed areas 54. A second green filter layer 60 is a silver halide emulsion layer that has been exposed and developed to form green filter dye areas 62 and green filter undyed areas 64. A blue filter layer 70 is a silver halide emulsion that has been exposed and developed to from blue filter dyed areas 72 and blue filter undyed areas 74. The exposure and development of a multi-layer color filter array can be done before application of layers on the opposite side of the sheet. Alternatively, color filter array 40 can be printed as a single layer on first surface 12a or second surface 12b using non-light sensitized printing processes such as screen printing. Exposure mask 90 (in FIG. 7) that forms traces in the light sensitive layers 14 and 28 is aligned to color filter array 40 so that traces 16 and 28 align to color filter array 40.

In a preferred embodiment all layers on both sides are exposed simultaneously. Layers of light absorbing material 75 are coated on one or both surfaces 12a and 12b of substrate 12. Light absorbing material 75 can be formulations well known in the art that provide anti-halation layers on silver halide films. The additional layers permit independent exposure of the layers on the two surfaces of substrate 12. Light absorbing material 75 is soluble in the solutions used to develop the light sensitive layers so that the substrate is optically transmitting after the sheet has been processed.

Figure 3:
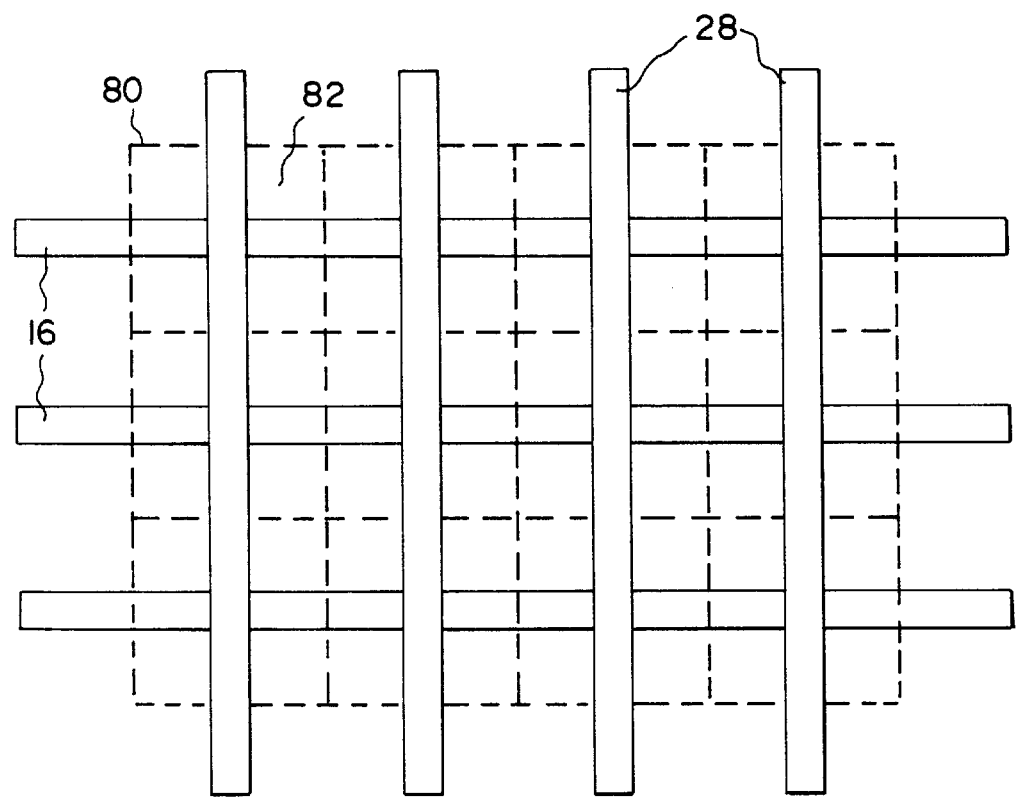
FIG. 3 is a top view of the completed structure.
Figure 4:
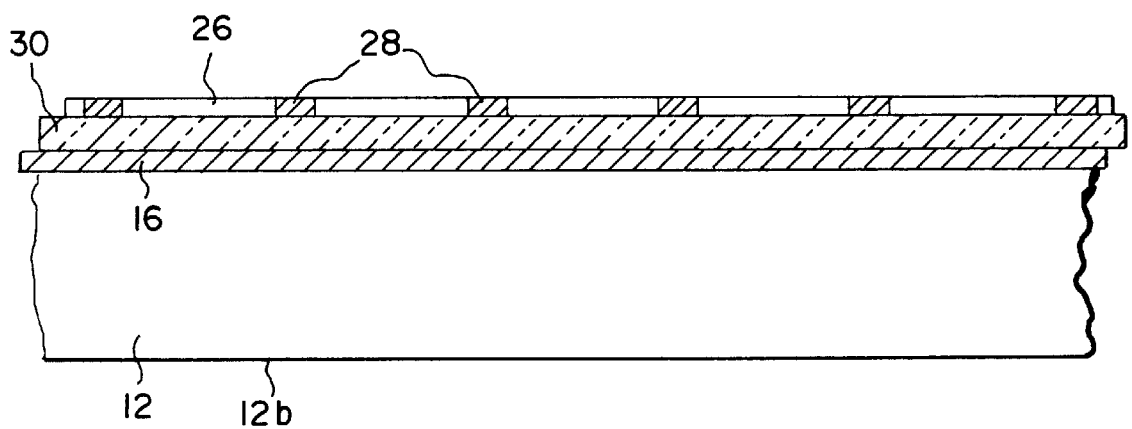
FIG. 4 is another embodiment of the invention.

Views of a completed sheet are shown in FIG. 3 and FIG. 4. For sake of clarity, it is assumed that the light modulating material has been driven to a transparent state and no color filter array has been applied to the second surface 12b of substrate 12. Vertical traces 28 are in second layer 24 and are formed by lines of green light. Light modulating layer 30 is transparent in the drawing. Horizontal traces 16 are formed in first light sensitive layer 14 using lines of red or infra-red light.

In this preferred embodiment, display 5 is designed to display images according to video standard SMPTE 274M. Horizontal traces 16 consist of 1080 traces that are 100 microns wide with 400 micron gaps between lines. There are 1920 vertical traces 28 which are 100 microns wide with 400 micron gaps between lines. Clear aperture is 400 microns square in a 500 square micron pixel.

Figure 5:
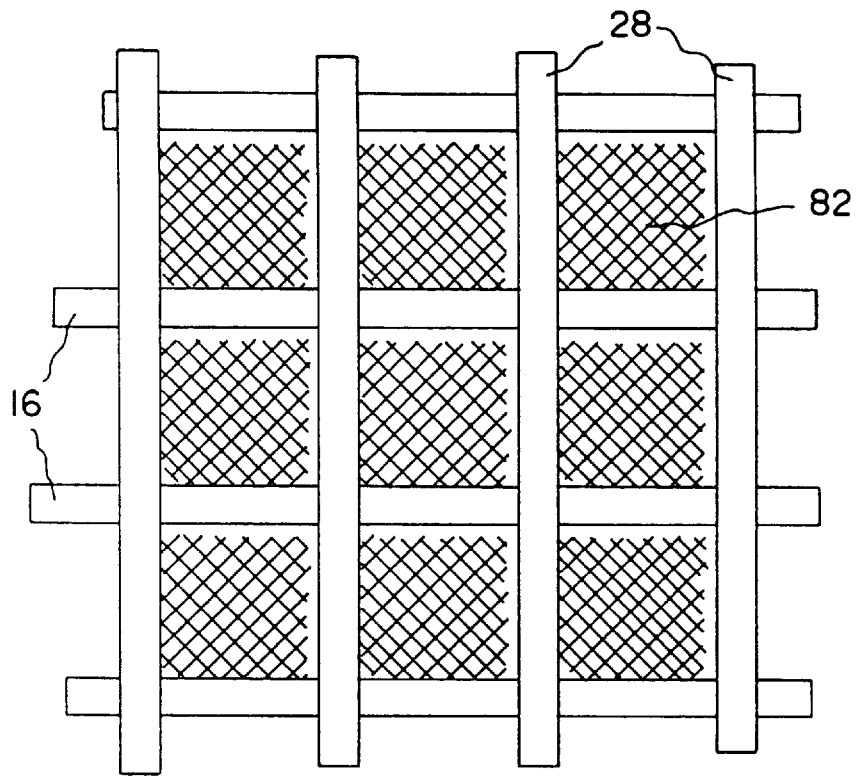
FIG. 5 is a top view of part of the invention.
Figure 6:
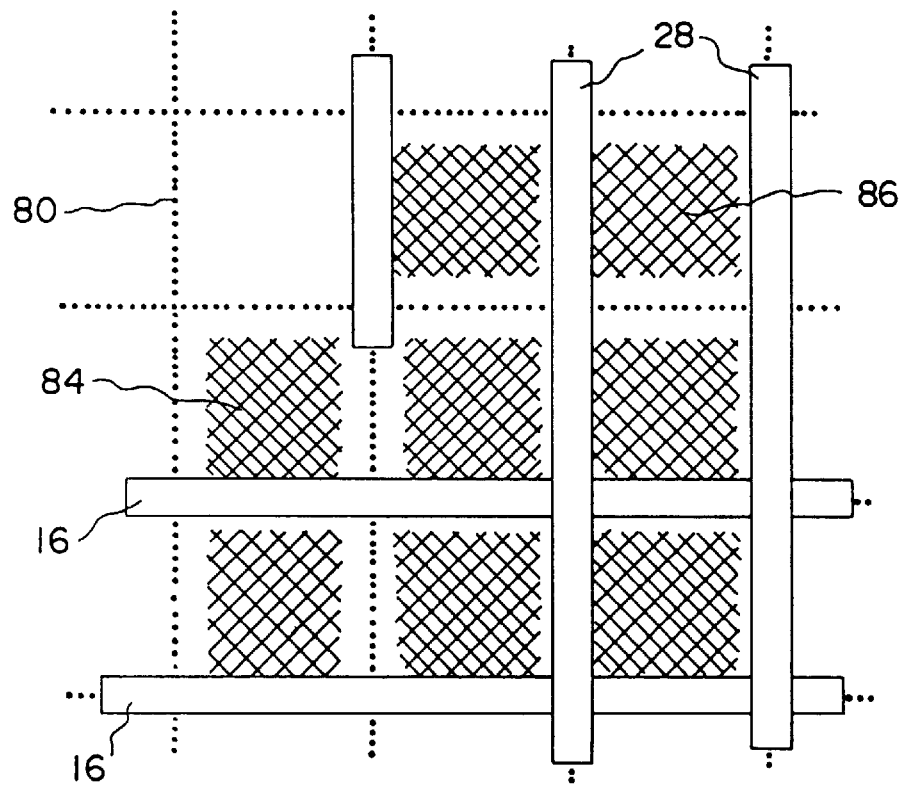
FIG. 6 is a broken sectional view of FIG. 5.

FIG. 5 and FIG. 6 detail a conductive structure that can be formed within each pixel 80. Horizontal traces 16 and vertical traces 28 are opaque and frame each pixel in this embodiment. A clear aperture 82 acts as the light modulating area for each pixel. Horizontal traces 16 have a vertical filament grid 84 across clear aperture 82. Vertical filament grid 84 can be composed of two sets of filaments 5 microns wide and pitched 15 microns apart that are orthogonal to each other and pitched a 45 degree angle. Horizontal filament grids 86 are similar in structure to vertical filament grid 84 and run horizontally from each vertical trace 28. The intersection of filament grids 84 and 86 across a clear aperture 82 spread electrical charge from traces 16 and 28 across clear aperture 82. Stated differently, the vertical and horizontal first and second conductive traces are aligned so that when a potential is applied between them, a field is produced which operates upon the light modulating material layer 30 to selectively transmit light which passes through the vertical traces 28, the light modulating layer 30, the horizontal traces 16, and the color filter array 40 so that a displayed image is produced.

In an alternative embodiment, pixel 80 is defined as the four quadrants around the intersection of the traces as shown in FIG. 3. Filament grids 84 and 86 are disposed into each of the four quadrants. This alternative structure has the advantage that an electrical field is stretched less than half way across clear aperture 82. This reduces field loss across grids 84 and 86 by reducing the distance that filament grids 84 and 86 spread charge.

The areas between filaments can be exposed to a level of radiation that causes limited metallic silver to be deposited in the clear areas between the filaments. Alternatively, a non-photosensitive, electrically conductive and optically transparent material such as fine Indium-Tin Oxide with particle size between 0.5 and 2 microns can be incorporated in layers 14 and 24 to spread the electrical field across opening between the filaments. In another embodiment, Indium-Tin Oxide is sputter coated on first surface 12a of substrate 12 before light sensitive layers 14 and 24 are applied. In the pre-sputtered embodiment, the ITO material acts to spread charge across substrate 12 in the vicinity of horizontal traces 16. This permits improvements in light transmission properties through clear aperture 82 in the first light sensitized layer 14. Some light striking each pixel is blocked by the opacity of the traces 16 and 28 and filament grids 84 and 86, and the remainder is controlled by the electrically field between processed first light sensitive layer 14 and processed second light sensitive layer 24.

FIG. 7 is a schematic representation of how conductive traces are formed in light sensitive layers 14 and 24 in accordance with a modification to U.S. Pat. No. 3,033,765 and U.S. Pat. No. 3,464,822. In this embodiment, unexposed silver halide 92 is the light sensitive material. In the drawing a single layer is shown for an example. In FIG. 7a, photo-mask 90 selectively blocks a source of light that strikes and exposes silver halide 94 while unexposed silver halide 92 remains inactivated. Multiple exposures using separate masks and separate color illuminant can be used to develop traces in each metal forming layer. Alternatively, a single mask having a composite multi-colored mask can be used to form traces in light sensitive layers 14 and 24. In FIG. 7b the display 5 is photographically developed to convert exposed silver halide 94 to metallic silver 96. In FIG. 7c, a conventional photographic fixing step has removed the unexposed silver halide 92. In FIG. 7d, metallic silver 96 has been re-halogenated by a bleach to form re-halogenated silver 98. In FIG. 7e, re-halogenated silver 98 has been redeveloped to form redeveloped silver 100. Metallic salts in the developer deposits additional metal 102 to improve conductivity. In an alternative process, the silver metal particles in gelatin are subjected to a first plating bath to deposit palladium metal onto the silver grains. A final plating bath of copper salts adds additional conductor to improve the conductivity of the traces.

Figure 8A:
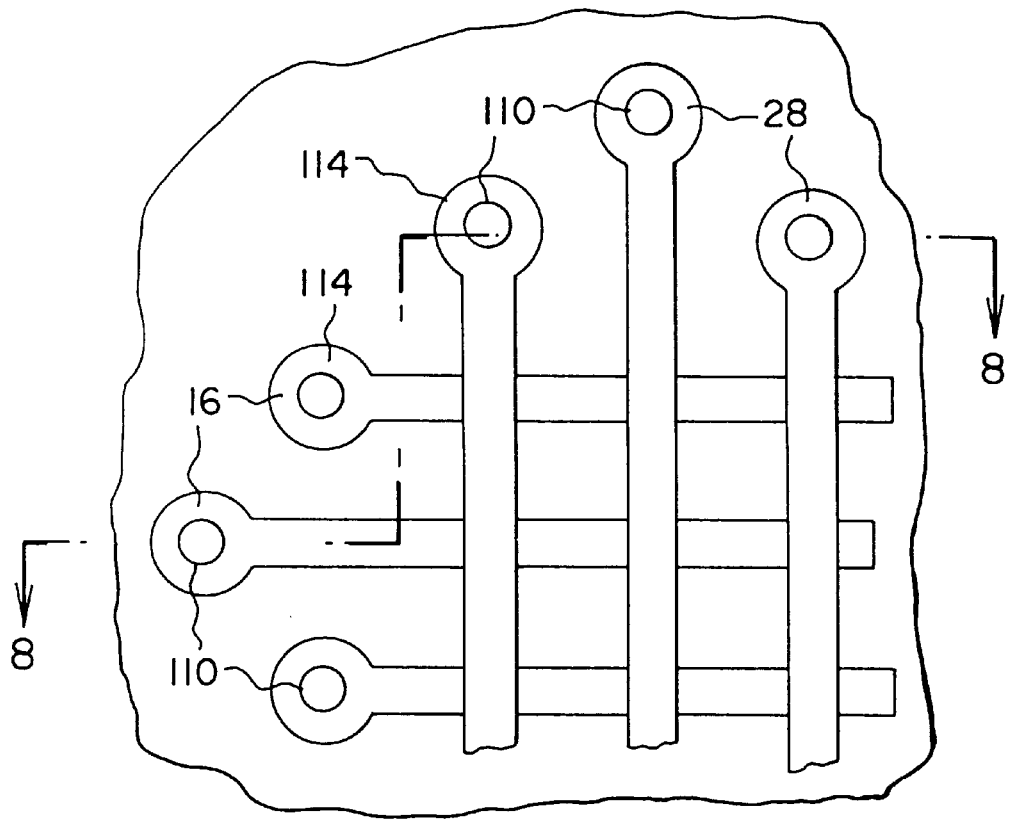
FIG. 8a is a top view showing the termination of the conductive traces.
Figure 8B:
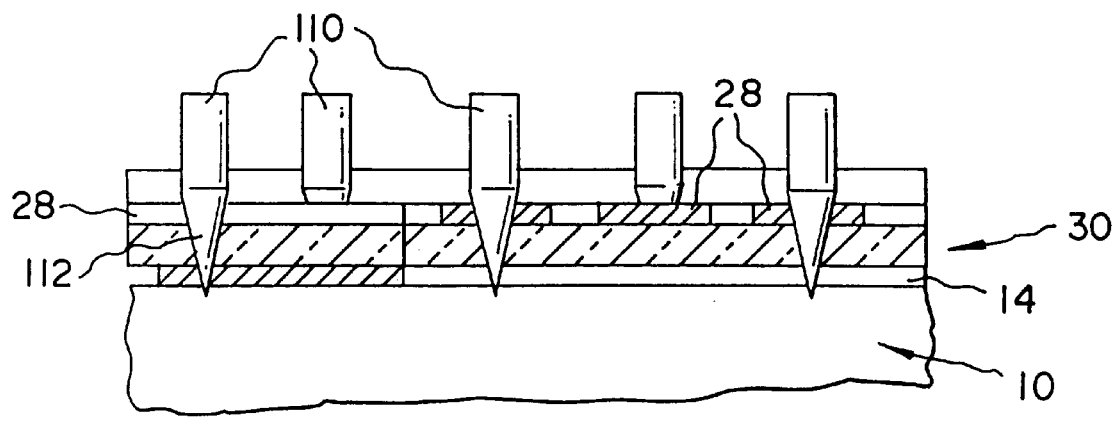

Electrical connection to display 5 is shown in FIGS. 8a and 8b. Horizontal traces 16 and vertical traces 28 terminate in a staggered pattern of conductive pads 114. Pins 110 having a piercing point 112 are disposed in a rigid non-conductive substrate. The pins are pressed into display 5 so that piercing point 112 is driven through the pads 114 at the end of traces 16 and 28. The piercing action provides electrical interconnectivity for traces 16 and 28 of the display.

The invention has been described in detail with particular reference to certain preferred embodiments thereof, but it will be understood that variations and modifications can be effected within the spirit and scope of the invention.

| PARTS LIST | |
|---|---|
| 5 | display |
| 12 | substrate |
| 12a | first surface |
| 12b | second surface |
| 14 | first light sensitive; metal forming layer |
| 16 | horizontal traces |
| 24 | second light sensitive layer |
| 26 | second sheet non-conducting areas |
| 28 | second sheet conducting areas (vertical traces) |
| 30 | light modulating layer |
| 40 | color filter array |
| 50 | red filter layer |
| 52 | red filter dye area |
| 54 | red filter undyed area |
| 60 | green filter layer |
| 62 | green filter dye area |
| 64 | green filter undyed area |
| 70 | blue filter layer |
| 72 | blue filter dyed area |
| 74 | blue filter undyed area |
| 75 | light absorbing material |
| 80 | pixel |
| 82 | clear aperture |
| 84 | vertical filament grid |
| 86 | vertical filament grid |
| 90 | photo-mask |
| 92 | unexposed silver halide |
| 94 | exposed silver halide |
| 96 | metallic silver |
| 98 | re-halogenated silver |
| 100 | redeveloped silver |
| 102 | additional metal |
| 110 | pins |
| 112 | piercing point |
| 114 | pads |

What is claimed is:

1. A structure used in making a display for forming images comprising:

a) a transparent substrate having first and second surfaces;

b) a light sensitive conductor layer provided over the first surface of the transparent substrate and patternable to form conductive traces;

c) a layer including light modulating material being provided over the light sensitive conductor layer; and d) a second light sensitive conductor forming layer provided over the light modulating material layer.

2. The structure of claim 1 further including a plurality of filter forming layers formed on the second surface.

3. The structure of claim 2 wherein the filter forming layers include silver halide emulsions.

4. The invention of claim 1 wherein said light modulating material is a suspension of liquid crystal material.

5. A display for forming images comprising:

a) a transparent substrate having first and second surfaces;

b) a first set of conductive traces formed from patterned light sensitive material and provided over the first surface of the transparent substrate;

c) a layer including a light modulating material being provided over the light sensitive conductive layer;

d) a second set of conductive traces formed from patterned light sensitive material and provided over the light modulating material layer; and e) the first and second sets of conductive traces being aligned so that when a potential is applied between them, a field is produced which operates upon the light modulating material layer to selectively transmit light which passes through the transparent substrate through the light modulating layer to form a displayed image.

6. The display according to claim 5 further including a color filter array provided over the second surface of the transparent substrate and aligned with the first and second sets of conductive traces to form color images.

7. The display according to claim 6 wherein the color filter array includes a plurality of layers each having colored dyed portions.

8. The invention of claim 6 wherein said color filter array is a plurality of light-sensitive dye forming layers.

9. The invention of claim 5 wherein a light sensitive color filter structure is formed on the second surface of the transparent substrate.

10. A display for forming images having a sheet comprising:

a) a transparent substrate having first and second surfaces;

b) a first set of conductive traces formed from patterned light sensitive material and provided over the first surface of the transparent substrate;

c) a layer including a light modulating material being provided over the light sensitive conductive layer;

d) a second set of conductive traces formed from patterned light sensitive material and provided over the light modulating material layer; and e) the first and second sets of conductive traces being aligned so that when a potential is applied between them, a field is produced which operates upon the light modulating material layer to selectively transmit light which passes through the transparent substrate through the light modulating layer to form a displayed image.

* * * * *